Patented Nov. 24, 1925.

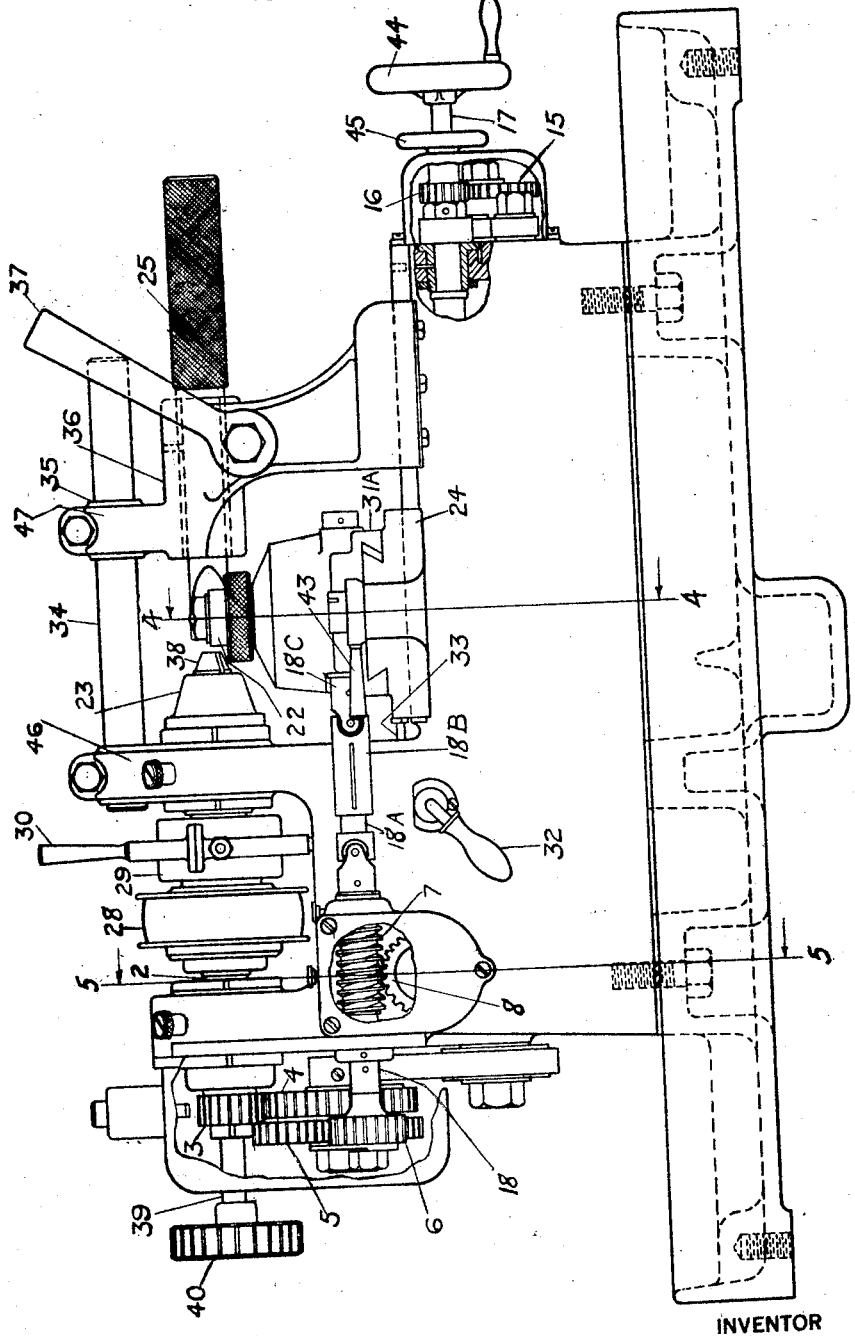

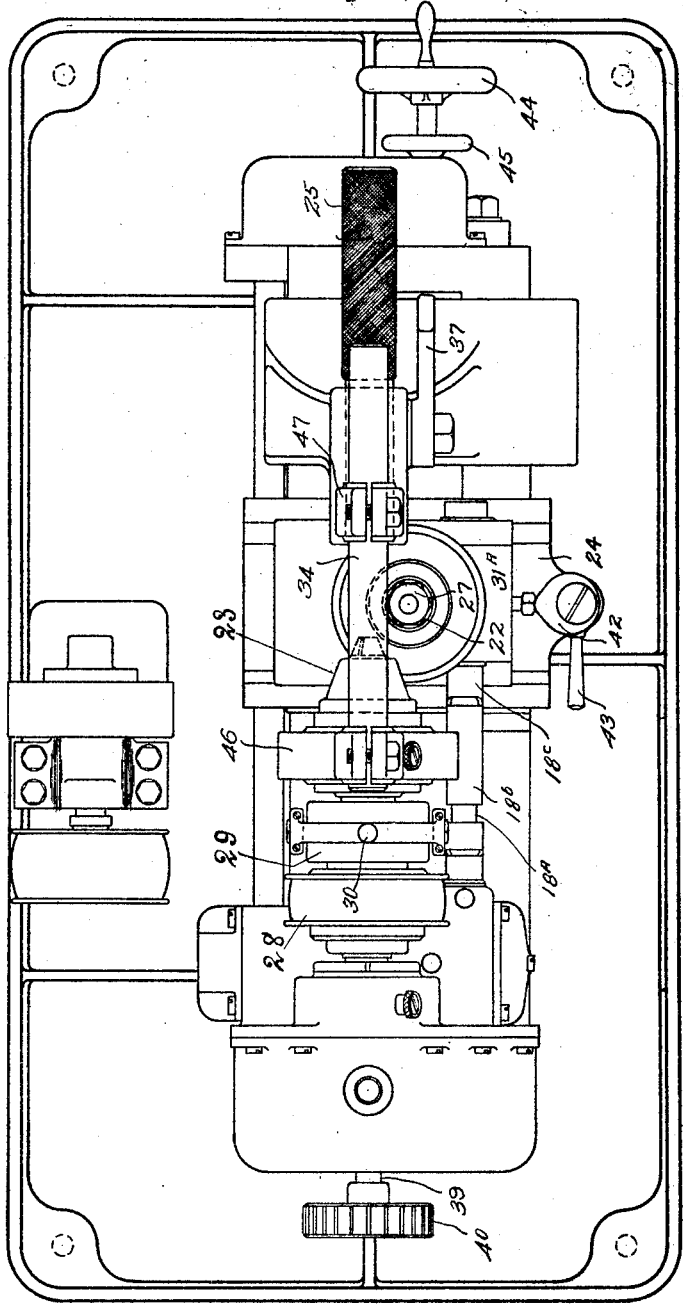

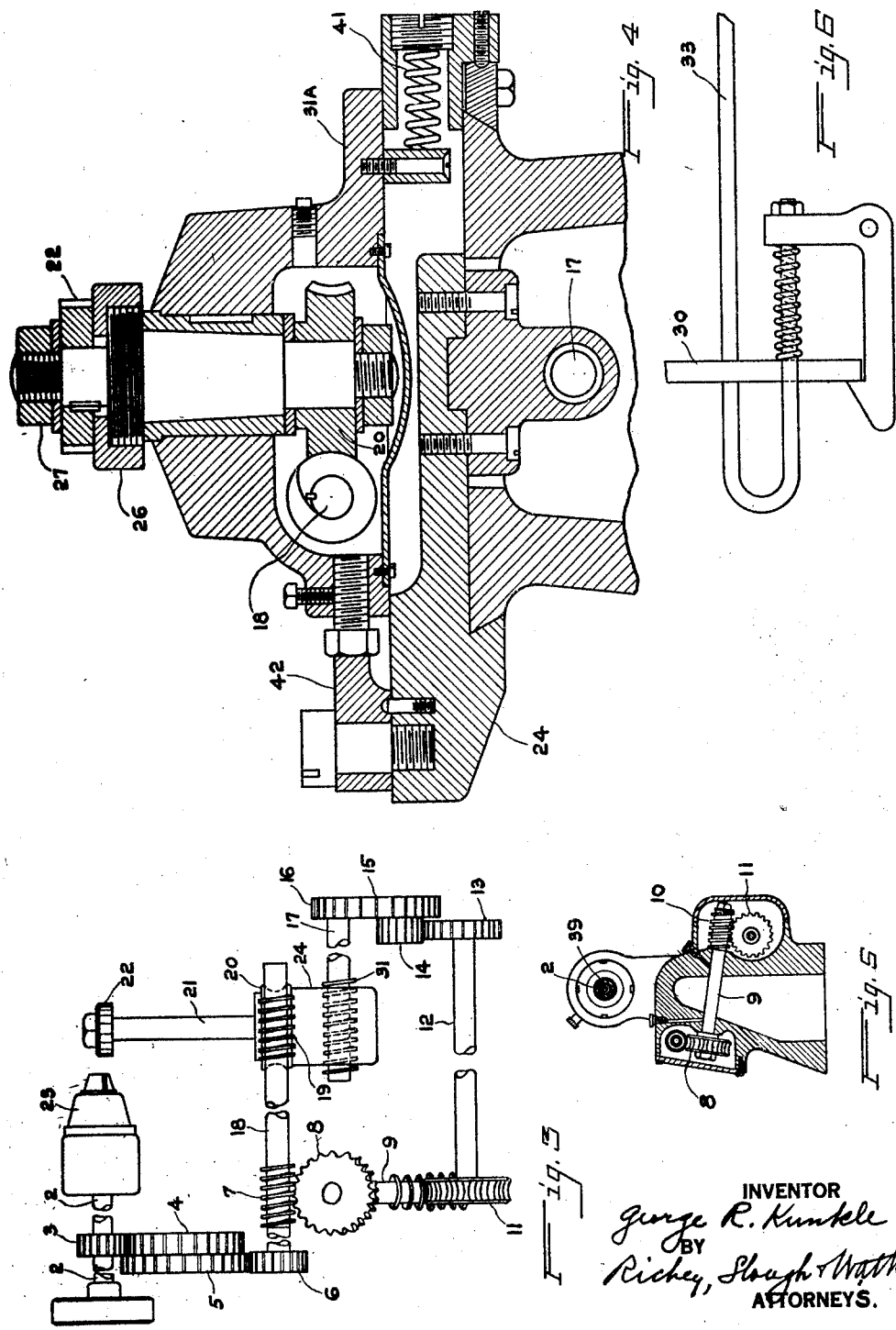

1,562,705

UNITED STATES PATENT OFFICE.

GEORGE R. KUNKLE, OF ELYRIA, OHIO, ASSIGNOR TO THE GENERAL PHONOGRAPH MANUFACTURING COMPANY, OF ELYRIA, OHIO, A CORPORATION OF OHIO.

THREAD-CUTTING MACHINE.

Application filed August 13, 1921. Serial No. 491,985.

*To all whom it may concern:*

Be it known that I, GEORGE R. KUNKLE, a citizen of the United States, residing at Elyria, county of Lorain, State of Ohio, have invented certain new and useful Improvements in Thread-Cutting Machines, and do hereby declare the following to be a full, clear, and exact description of the invention, such as will enable others skilled in the art to which it appertains to make and use the same.

My invention relates to thread cutting machines, and among the objects of my invention are the following:—

To provide a machine of the above character in which a rotary cutter is used and in which the cutter travels and in which the work rotates;

To provide a machine of the above character in which the cutter rotates about a vertical axis and in which the cutter travels along a line parallel with the work and in which the work rotates about a horizontal axis;

To provide in a machine of the above character a travelling cutter having a plurality of cutting teeth;

To provide in a machine of the above character a cutter having a plurality of teeth and adapted to cut simultaneously a plurality of threads;

To provide other features of improvement tending to increase the efficiency and serviceability of machines of the above character.

The features of my invention for accomplishing the foregoing and other useful ends are hereinafter more fully set forth and claimed.

Referring to the drawings, Fig. 1 shows a machine of my invention in elevation.

Fig. 2 is a plan view of the same.

Fig. 3 is a simplified representation of the gear connections for controlling the plurality of movements between the work and the cutter.

Fig. 4 is a section on line 4—4, Fig. 1.

Fig. 5 is a section on line 5—5, Fig. 1.

Fig. 6 is a detail view of the latch mechanism.

Referring more in detail to the drawings and more particularly to Figs. 1, 2, and 3, it will be seen that the machine is so designed that one end of the work is gripped in a collet, 23, while the other end of the work is supported by the end rest, 25. The work is designed to spin about a horizontal axis with the collet between the collet and the rest. With regard to the cutting tool, 22, it will be seen that this tool is mounted on a carriage, 24. This tool is arranged to rotate about a vertical axis at the same time that the work rotates about a horizontal axis. Furthermore, the machine is so arranged that the carriage, 24, travels along a line parallel to the work. I will proceed to describe the operation of the machine on the assumption that it is desired to cut a screw having two threads winding about the stem, one thread one hundred and eighty degrees in the lead of the other.

The cutting tool is a circular drum with the teeth running parallel to each other and parallel with the axis of rotation of the tool, as indicated in Fig. 4. In order to have the machine cut two threads at the same time the cutter is designed with a number of teeth and it is so geared with the work that to each revolution of the work a given tooth rotates a distance having a component parallel with the axis of rotation of the work, equal to the pitch of a particular thread. In cutting two threads at the same time a cutting tool is used with the teeth arranged that the first tooth will engage the work and carve out metal along the groove of one thread and by the time the work has made one-half of one revolution, the next succeeding tooth begins to engage the work and begins to carve the groove for the second thread. The third tooth, upon the next one-half revolution of the work, next begins to engage the work in the first groove and the fourth tooth upon the next half revolution of the work begins to engage the second groove and so on until the cutter makes a complete revolution when the first tooth again engages the first groove, whereupon the same series of operations are repeated.

I wish it understood, however, that the teeth may be an odd number or an even number. But I prefer to use an odd number as it ensures uniformity in threads inasmuch as the same teeth are used to cut in all the threads. That is, after one revolution of the tooth the first tooth will cut, not in the original groove but in some other groove. For example, if two grooves are being cut the first tooth at the end of the first revolution will cut in the second groove, and at the end of the second revolution it will again cut in the first groove and so on.

Now in addition to the above motion of the cutter, the cutter advances slowly along a line parallel with the axis of rotation of the work so that the first tooth at the end of the first rotation of the cutter does not engage the work at the same point that it did originally, although it does engage the same groove. The engagement with the groove takes place further along to the left.

Referring to Fig. 4, it will be seen that cutter, 22, is held between the nuts, 26, and 27. Nut, 26, is threaded inside so that the height of the cutter with respect to the work may be regulated up and down.

Referring to Figs. 1 and 2, pulley 28 is driven by a belt, and from any suitable source of power. This pulley runs idly on a shaft, 2, when the work is not being turned. Just to the right of the pulley and overlapped by the pulley somewhat there is a clutch, 29, controlled by the lever, 30. By throwing the lever, 30, to the left the clutch grips with the pulley, 28, and drives the shaft, 2, thereby driving the collet, 38. At the same time the shaft, 2, drives the gears, 3, 4, 5 and 6, thereby driving the shaft, 18. On shaft, 18, there are two worms, 7 and 19. Worm, 19, engages the gear, 20, which in turn drives the cutter shaft, 21, and rotates the cutter, 22. On the other hand the worm, 7, rotates the gear, 8, and shaft, 9, which latter carries the worm, 10, Fig. 5 that engages the gear, 11. The gear, 11, is mounted on the shaft 12. Through the medium of the shaft, 12, the gears, 13, 14, 15 and 16 are rotated and therefore the shaft, 17, is driven. On the shaft, 17, there is a worm, 31, through the medium of which the carriage, 24, is caused to travel forward carrying the cutter, 22, with it, as previously indicated.

Referring to Fig. 1, it will be seen that the shaft, 18, is made up in sections. Just to the right of the worm, 7, there is a universal joint, through the medium of which the section 18$^A$ of the shaft is rotated. The section 18$^A$ is splined. In conjunction with the section 18$^A$, the section 18$^B$ operates in telescopic fashion. The section 18$^B$ is driven by the section 18$^A$ through the medium of the spline arrangement but as indicated 18$^B$ may slide back and forth on the section 18$^A$. It will be seen that another universal joint is provided in connection with the section 18$^B$, through the medium of which the section 18$^C$ is driven. On the section 18$^C$ is located the worm, 19, which rotates the cutter shaft, 21, as previously described. It will be understood that the object of the sectional arrangement of the shaft, 18, is to permit the carriage, 24, to move back and forth. This arrangement also permits the cross carriage, 31$^A$, which is mounted on the carriage, 24, to be moved in and out. These motions of the carriages, 24, and 31$^A$ do not interfere with the rotation of the shaft, 18. In other words while the machine is running the cutter may be adjusted to any position desired and having been adjusted, the gear, 16, may be thrown into engagement with gear, 15, and the carriage, 24, thereby fed automatically to the left.

Associated with the clutch, 29, which is controlled by the lever, 30, on the lower end of the lever, 30, and behind the shaft, 18, there is a latch, shown in Fig. 6, controlled by the lever, 32, Fig. 1. When the lever, 30, is thrown to the left the lower end of said lever which is located to the rear of the shaft, 18, catches behind the said latch, which latter holds the clutch locked in position during the operation of the machine. If it is desired at any time, to disengage the clutch, the lever, 32, is thrown counterclockwise which action depresses the latch and releases the clutch, whereupon the clutch moves to the right and the machine stops. I will explain also that the latch may be released by the carriage, 24, as it travels to the left under the action of the automatic feed. In Fig. 1 to the left of the carriage, 24, there is shown a plunger, 33. When the carriage, 24, approaches the end of its travel it presses the plunger, 33, which action releases the latch that holds the clutch thereby stopping the machine. It will be seen, therefore, that the lever, 32, and the plunger, 33, both control the release of the clutch in a similar fashion. The latch is mounted on a shaft which may be rotated either by lever, 32, or by the plunger, 33.

The feed mechanism includes the gears, 15 and 16, as already explained. Now the gear, 16, is mounted on the shaft, 17, so that it can slide along the shaft, a key in the shaft, 17, permitting it to slide on but not to rotate with respect to the shaft. Integral with the gear, 16, is the wheel, 45, on a connecting collar. By pressing the wheel, 45, to the right the gear, 16, can be slid out of engagement with the gear, 15, and thus prevent the feed mechanism from moving the carriage. Of course, by pressing the wheel, 45, to the left, the gear, 16, is thrown into engagement with the gear, 15, and the feed takes place automatically as is well understood.

In order to strengthen the rest, 25, and to minimize any deflection, and to insure accuracy and uniformity in the threads that are turned out, I provide a bridging bar, 34. This bar has the left end secured to one section of the machine. The other end of the bridge bar passes through a bearing, 35. This bearing is mounted on the frame, 36, that carries the rest, 25. The frame, 36 may, of course, be adjusted with respect to the collet, 23, depending upon the length of the work. It will be seen therefore that the bearing, 35, can be made to slide back and forth on the bar, 34, thereby permitting such adjustment. Adjustment being made the frame, 36, is made temporarily secure against movement. On the frame, 36, I also provide a clamping lever, 37, through the medium of which the rest, 25, may be tightly clamped into position after it is once adjusted into engagement with the right hand end of the work.

Referring again to the collet it will be understood that it contains the chuck, 38, which is centrally located. This chuck is provided with a threaded hole toward the left extremity which is engaged by a rod, 39, which latter is threaded on the right extremity. The hand wheel, 40, it will be observed, is on the left hand of the rod, 39. Therefore by turning the hand wheel, 40, in a clockwise direction the chuck, 38, is drawn in causing the chuck to grip whatever tool may be located within its jaws. The action of the clutch within the collet is very much the same as the action of a brace in holding a bit. Of course, the chuck, 38, is tapered and as it is drawn in by the rotation of the rod, 39, the jaws of the chuck are pressed together in the usual and well known manner. On the other hand by turning the hand wheel, 40, in a counterlockwise direction the chuck, 38, is released so that whatever work or tool it may have been gripping may be removed. It will be understood, of course, that the rod, 39, extends along the central hollow section of the shaft, 2.

With reference to the cross carriage, 31ᴬ, it will be seen by referring to Fig. 4 that there is a spring, 41, that is forcing the carriage, 31ᴬ, in a forward direction, thereby maintaining the same in contact with the cam 42 at all times. The position of the carriage, 31ᴬ, is controlled by the cam, 42, which latter is provided with a lever, 43. After the machine has started and before the automatic feed is thrown in the lever, 43, is rotated in a clock-wise direction, Fig. 2, with the result that the cam, 42, gradually, as the lever, 43, rotates, presses the carriage, 31ᴬ, rearwardly, carrying the tool, 22, into line with the work. As soon as this is done, the wheel, 45, Fig. 1, that controls the automatic feed operation is pressed to the left whereupon the carriage, 24, begins to move or travel to the left carrying the tool with it and cutting as it advances the threads on the rod that is held by the chuck, 38, and between the head stock, 46, and the tail stock, 47. The machine may then be left to run alone until the carriage, 24, strikes the plunger, 33, which automatically stops the machine. At the end of the travel the threads on the piece of work will be found completed. It will be understood from what has already been said that the odd numbered teeth in the rotary cutter will engage the work to cut the groove of one thread whereas the even numbered teeth will engage the work to cut a different or second thread on the work. Therefore the teeth alternately engage first one thread and then the next. It will be clear that as each tooth rotates by the work, it carves out a small portion of the threads and that the next alternate tooth carves out an additional portion of the same thread as it advances. This advance action is the result of the travel of the carriage, 24, toward the left. It will be clear, of course, that a tool may be used which may cut a single thread or that may cut more than two threads, depending upon the spacing of the teeth on the cutter and upon the rate of rotation between the piece of work and the tool. It will be clear, of course, that if the alternate teeth of the tool, 22, were left out that only one thread channel would be cut.

I have provided a hand wheel 44 which is keyed to shaft 17 to rotate therewith. When gear 16 is disengaged from gear 15 by pulling the wheel 44 to the right, Fig. 1, thereby cutting off all power being transmitted through shaft 12 to gear 16, the hand wheel 44 and the shaft 17 are free to turn. By turning the hand wheel to the right or left carriage 24 may be moved, through the worm 31, to the left or right, respectively. This provides a quick adjustment for carriage 24 when the power has been cut off from shaft 17.

I claim:

1. In a lathe, a movable cross carriage, a shaft rotatably mounted within and projecting from said cross carriage, a nut adjustably secured upon the projecting portion of said shaft, a tool slidably secured upon said shaft and engaging said adjustable nut, and means for securing said tool upon said shaft and against said adjustable nut.

2. In a lathe, a longitudinally movable carriage, a cross carriage mounted upon said carriage to be moved in a direction transversely thereupon, a tool rotatably mounted in said cross carriage, and mechanism for rotating said tool including an adjustable driving shaft, said shaft comprising telescoping sections one of which is mounted within said cross carriage, each of said sections having a universal joint therein intermediate its ends.

3. In a lathe, a longitudinally movable carriage, a cross carriage mounted upon said carriage to be moved in a direction transversely thereupon, a tool rotatably mounted in said cross carriage, and mechanism for rotating said tool including an adjustable drive shaft, said shaft comprising a plurality of sections, one of which is mounted within said cross carriage, each of said sections having a universal joint therein intermediate its ends.

In witness whereof, I have hereunto signed my name this 4th day of August, 1921.

GEORGE R. KUNKLE.